(12) United States Patent
Atkins et al.

(10) Patent No.: US 11,755,656 B2
(45) Date of Patent: *Sep. 12, 2023

(54) FEEDBACK CONTROL FOR AUTOMATED MESSAGING ADJUSTMENTS

(71) Applicant: Capital One Services, LLC, McLean, VA (US)

(72) Inventors: Phoebe Atkins, Rockville, VA (US); Max Miracolo, Brooklyn, NY (US); Joshua Edwards, Philadelphia, PA (US); Brian McClanahan, Silver Spring, MD (US); Alexander Lin, Arlington, VA (US); Lin Ni Lisa Cheng, New York, NY (US); Cruz Vargas, Denver, CO (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,349

(22) Filed: Jun. 13, 2022

(65) Prior Publication Data

US 2023/0052787 A1 Feb. 16, 2023

Related U.S. Application Data

(63) Continuation of application No. 17/396,919, filed on Aug. 9, 2021, now Pat. No. 11,386,160.

(51) Int. Cl.
*G06F 16/9032* (2019.01)
*G06F 16/901* (2019.01)
(Continued)

(52) U.S. Cl.
CPC .... *G06F 16/90332* (2019.01); *G06F 16/9017* (2019.01); *G06F 16/9035* (2019.01);
(Continued)

(58) Field of Classification Search
CPC ............ G06F 16/9535; G06F 16/3329; G06F 16/353; G06F 16/9562; G06F 16/958; G06G 16/36
(Continued)

(56) References Cited

U.S. PATENT DOCUMENTS 5,963,940 A * 10/1999 Liddy .................. G06F 16/353
707/999.005
6,026,388 A * 2/2000 Liddy ................. G06F 16/3344
707/999.005
(Continued)

FOREIGN PATENT DOCUMENTS

WO WO-2018132840 A1 * 7/2018 ............. G06F 40/30
WO WO-2019175571 A1 * 9/2019 ......... G06F 16/3329

OTHER PUBLICATIONS

Reichensdörfer et al, "Recurrent Neural Networks for PID Auto-Tuning. Adaptive Control and Identification of Nonlinear Systems", Institute for Data Processing, 84 pages, Sep. 9, 2017.

*Primary Examiner* — Shahid A Alam
(74) *Attorney, Agent, or Firm* — DLA Piper LLP US

(57) ABSTRACT

A processor may receive data and generate a quantified representation of the data by processing the data using at least one machine learning (ML) algorithm, the quantified representation of the data indicating a sentiment of content of the data. The processor may automatically revise the content of the communications data. The revising may include determining a reaction to the content of the communications data, generating a quantified representation of the reaction, determining a difference between the quantified representation of the reaction and the quantified representation of the communications data, identifying, based on the difference, a portion of the content having an unintended sentiment, and replacing the portion of the content with different content.

20 Claims, 8 Drawing Sheets

(51) Int. Cl.
*G06F 16/9038* (2019.01)
*G06F 16/9035* (2019.01)
*G06N 20/00* (2019.01)
*G06F 18/214* (2023.01)

(52) U.S. Cl.
CPC ........ *G06F 16/9038* (2019.01); *G06F 18/214* (2023.01); *G06N 20/00* (2019.01)

(58) Field of Classification Search
USPC ..................................... 704/9; 707/723, 769
See application file for complete search history.

(56) References Cited

U.S. PATENT DOCUMENTS

| | | |
|---|---|---|
| 9,870,629 B2 | 1/2018 | Cardno et al. |
| 2010/0262454 A1* | 10/2010 | Sommer .............. G06F 16/355 706/55 |
| 2011/0289078 A1* | 11/2011 | Woodard ........... G06F 16/9562 707/723 |
| 2012/0110009 A1* | 5/2012 | Kraft ................... G06F 16/9535 707/769 |
| 2013/0231974 A1* | 9/2013 | Harris ................ G06Q 30/0201 705/7.29 |
| 2013/0254231 A1* | 9/2013 | Decker ............. G06F 16/24573 707/770 |
| 2014/0082019 A1 | 3/2014 | Taylor et al. |
| 2015/0142520 A1* | 5/2015 | Bala ................... G06Q 30/0203 705/7.32 |
| 2015/0222586 A1 | 8/2015 | Ebersman et al. |
| 2015/0348159 A1* | 12/2015 | Gardyne ............. G06F 16/9535 705/26.62 |
| 2016/0110403 A1 | 4/2016 | Lomet et al. |
| 2018/0211287 A1 | 7/2018 | Byron et al. |
| 2018/0276289 A1 | 9/2018 | Gross et al. |
| 2019/0333078 A1 | 10/2019 | Bala et al. |
| 2020/0004816 A1 | 1/2020 | Kieser et al. |
| 2020/0265184 A1 | 8/2020 | Kargiannakis et al. |

* cited by examiner

FEEDBACK CONTROL FOR AUTOMATED MESSAGING ADJUSTMENTS

CROSS-REFERENCE TO RELATED APPLICATIONS

This application is a Continuation of U.S. Ser. No. 17/396,919, filed Aug. 9, 2021, the entirety of which is incorporated herein by reference.

BACKGROUND

In mechanical and electrical engineering, the idea of feedback control for physical systems is well established. Broadly speaking, a feedback controller tailors current input to achieve a desired output, and sophisticated feedback controllers smooth out large changes in input to avoid overloading systems under control and/or overshooting desired output targets. For example, a home thermostat regulates temperature by, at minimum, sampling the current temperature and evaluating the difference between the current and desired temperatures to determine whether to apply energy (i.e., heat or air conditioning) to adjust the current temperature. More sophisticated systems also evaluate the rate of change of temperature (derivative) and the integral of temperature change over time. A feedback controller that utilizes the proportional difference, the integral of change over time, and the derivative of change over time is commonly referred to as a PID controller.

Meanwhile, in the field of computer science, machine learning (ML) systems are employed for a variety of uses, including natural language processing (NLP). These systems are often used to automatically evaluate and even generate text based on past data, such as training data that has been fed into a ML algorithm to generate a model. However, particularly for public-facing text, past data is not always a good indicator of how newly published text will be perceived. Public opinion changes frequently, and text that was acceptable in the past (e.g., when training data was gathered) may be considered improper, potentially even offensive, in the future. NLP is one example, but other ML processes may be similarly ill equipped to anticipate changes in the environments in which they are employed.

BRIEF DESCRIPTIONS OF THE DRAWINGS

DETAILED DESCRIPTION OF SEVERAL EMBODIMENTS

Figure 1:
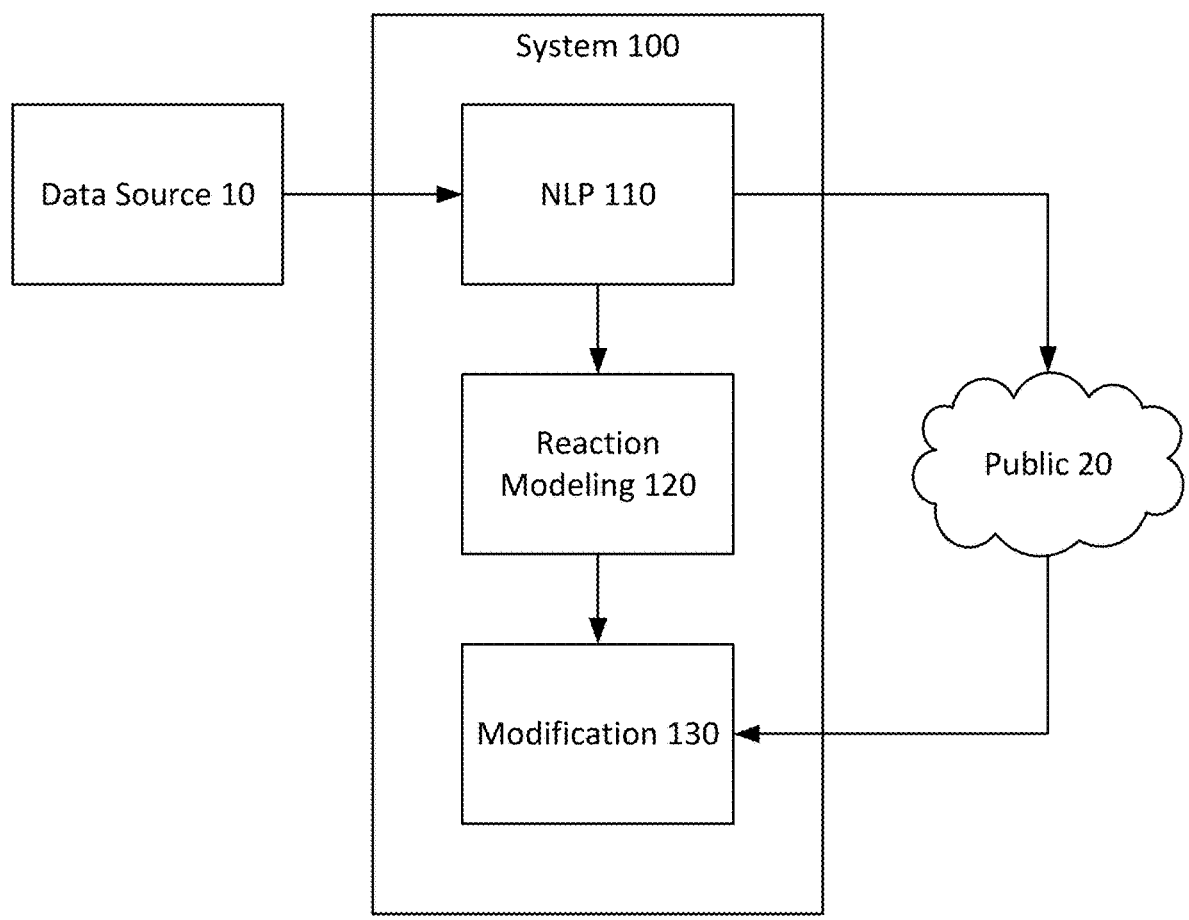
FIG. 1 shows an example automatic message adjustment system according to some embodiments of the disclosure.

Embodiments described herein improve ML processes such as NLP by enabling them to use feedback to automatically improve their processing in response to a changing environment. As an illustrative example according to the embodiments described herein, text (or video or audio script) that is to be published to an audience may be evaluated by automated feedback processing to target portions for revision. For example, the sentiment evoked by language may change over time, due to changing public tastes or opinions, and some disclosed embodiments can automatically adjust the sentiment of a document to avoid offense, misinterpretation, or other problems.

For example, some embodiments described herein may include a method comprising receiving, by a processor, text data. The method may comprise generating, by the processor, a quantified representation of the text data by processing the text data using at least one NLP algorithm, the quantified representation of the text data indicating a sentiment of content of the text data. The method may comprise automatically revising, by the processor, the content of the text data. The revising may comprise determining a reaction to the content of the text data, generating a quantified representation of the reaction, determining a difference between the quantified representation of the reaction and the quantified representation of the text data, identifying, based on the difference, a portion of the content having an unintended sentiment, and replacing the portion of the content with different content.

In some embodiments, the revising may further comprise comparing the quantified representation of the text data to quantified reference data, identifying, based on the comparing, a second portion of the content having an unintended sentiment, and replacing the second portion of the content with second different content.

In some embodiments, the revising may further comprise replacing a third portion of the content with untested replacement content, publishing the text data including the untested replacement content and obtaining feedback from at least one public source, generating a quantified representation of the feedback, determining which one of the quantified representation of the reaction and the quantified representation of the feedback has a preferred sentiment, and including the third portion of the content in the text data in response to the quantified representation of the reaction having the preferred sentiment or including the untested replacement in the text data in response to the quantified representation of the feedback having the preferred sentiment.

In some embodiments, the replacing may comprise generating at least a portion of the different content by executing a natural language generation algorithm, identifying at least a portion of the different content by performing a thesaurus lookup, receiving at least a portion of the different content as user input, or a combination thereof.

In some embodiments, determining the reaction may comprise publishing the text data and obtaining feedback from at least one public source.

In some embodiments, determining the reaction may comprise performing machine learning processing of the quantified representation of the text data and a model of past reactions, future reactions, or a combination thereof. Some embodiments may further comprise training the model, the training comprising creating future reaction training data through extrapolation of past reaction training data.

In another example, some embodiments described herein may include a system comprising a processor and a non-transitory computer-readable medium in communication with the processor and storing instructions that, when executed by the processor, cause the processor to perform processing. The processing may comprise receiving text data, generating a quantified representation of the text data by processing the text data using at least one NLP algorithm, the quantified representation of the text data indicating a sentiment of content of the text data, and automatically revising the content of the text data. The revising may comprise determining a reaction to the content of the text data, generating a quantified representation of the reaction, determining a difference between the quantified representation of the reaction and the quantified representation of the text data, identifying, based on the difference, a portion of the content having an unintended sentiment, and replacing the portion of the content with different content.

In some embodiments, the revising may further comprise comparing the quantified representation of the text data to quantified reference data, identifying, based on the comparing, a second portion of the content having an unintended sentiment, replacing the second portion of the content with second different content.

In some embodiments, the revising may further comprise replacing a third portion of the content with untested replacement content, publishing the text data including the untested replacement content and obtaining feedback from at least one public source, generating a quantified representation of the feedback, determining which one of the quantified representation of the reaction and the quantified representation of the feedback has a preferred sentiment, and including the third portion of the content in the text data in response to the quantified representation of the reaction having the preferred sentiment or including the untested replacement in the text data in response to the quantified representation of the feedback having the preferred sentiment.

In some embodiments, the replacing may comprise generating at least a portion of the different content by executing a natural language generation algorithm, identifying at least a portion of the different content by performing a thesaurus lookup, receiving at least a portion of the different content as user input, or a combination thereof.

In some embodiments, determining the reaction may comprise publishing the text data and obtaining feedback from at least one public source.

In some embodiments, determining the reaction may comprise performing machine learning processing of the quantified representation of the text data and a model of past reactions, future reactions, or a combination thereof. Some embodiments may further comprise training the model, the training comprising creating future reaction training data through extrapolation of past reaction training data.

In another example, some embodiments described herein may include a method comprising receiving, by a processor, communications data. The method may further comprise generating, by the processor, a quantified representation of the communications data by processing the communications data using at least one ML algorithm, the quantified representation of the communications data indicating a sentiment of content of the communications data. The method may further comprise automatically revising, by the processor, the content of the communications data. The revising may comprise determining a reaction to the content of the communications data, generating a quantified representation of the reaction, determining a difference between the quantified representation of the reaction and the quantified representation of the communications data, identifying, based on the difference, a portion of the content having an unintended sentiment, and replacing the portion of the content with different content.

In some embodiments, the revising may further comprise comparing the quantified representation of the communications data to quantified reference data, identifying, based on the comparing, a second portion of the content having an unintended sentiment, and replacing the second portion of the content with second different content.

In some embodiments, the revising may further comprise replacing a third portion of the content with untested replacement content, publishing the communications data including the untested replacement content and obtaining feedback from at least one public source, generating a quantified representation of the feedback, determining which one of the quantified representation of the reaction and the quantified representation of the feedback has a preferred sentiment, and including the third portion of the content in the communications data in response to the quantified representation of the reaction having the preferred sentiment or including the untested replacement in the communications data in response to the quantified representation of the feedback having the preferred sentiment.

In some embodiments, determining the reaction may comprise publishing the communications data and obtaining feedback from at least one public source.

In some embodiments, determining the reaction may comprise performing machine learning processing of the quantified representation of the communications data and a model of past reactions, future reactions, or a combination thereof. Some embodiments may further comprise training the model, the training comprising creating future reaction training data through extrapolation of past reaction training data.

FIG. 1 shows an example automatic message adjustment system 100 according to some embodiments of the disclosure. System 100 may include a variety of hardware, firmware, and/or software components that interact with one another and with data source(s) 10 and/or public source(s) 20. For example, system 100 may include NLP system 110, reaction modeling processing 120, and/or modification processing 130, each of which may be implemented by one or more computers (e.g., as described below with respect to FIG. 8). As described in detail below, system 100 may obtain text or other data to process from data source 10. NLP 110, reaction modeling 120, and modification processing 130 may process the text or other data, including modeling likely public response to the information therein, and modify the text according to the likely public response. In some embodiments, in addition to or instead of modeling likely public response, system 100 may receive feedback from public sources 20 on how the text is actually received by at least some external observers.

Data source 10, system 100 and individual elements of system 100 (NLP system 110, reaction modeling 120, and modification processing 130), and public source 20 are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while NLP system 110, reaction modeling 120, and modification processing 130 are depicted separately, any combination of these elements may be part of a combined hardware, firmware, and/or software element. Moreover, while one data source 10 and one public source 20 are shown, in practice, there may be multiple data sources 10, multiple public sources 20, or both.

Figure 2:
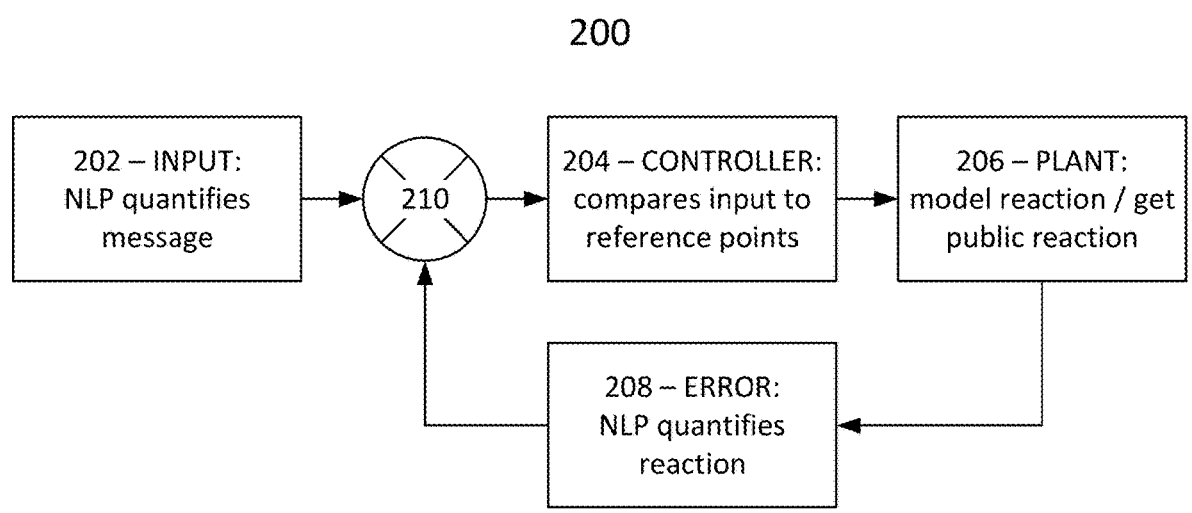
FIG. 2 shows an example automatic message adjustment feedback loop according to some embodiments of the disclosure.

FIG. 2 shows an example automatic message adjustment feedback loop 200 according to some embodiments of the disclosure. Elements of system 100 (e.g., NLP system 110, reaction modeling 120, and modification processing 130) may operate loop 200 to analyze and modify inputs based on predicted and/or observed reactions thereto. Loop 200 provides an overview of the automatic message adjustment processing described herein, and subsets thereof are described in detail in subsequent figures.

The PID-style feedback loop 200 may include an input 202, controller 204, plant 206, error section 208, and summing junction 210. Input 202 may be text to be analyzed and/or published. For example, input 202 may include text of a text and/or graphical advertisement to be published, text of a script for an audio or visual advertisement, or any other text. As described in detail below, the text may be input by a user, scanned using OCR, or obtained in other ways, and may be processed using one or more NLP algorithms to quantify the text. The quantification may indicate sentiment of the text.

After text is initially received and processed using NLP, no feedback may yet be available. Therefore, the loop 200 may proceed past the summing junction 210 to controller 204 processing. Controller 204 may process the quantified text prior to real or simulated publication. For example, this processing may include comparison of the quantified data to reference points to provide a first filter for the sentiment of the text. As described in detail below, the text may be compared to other ads with known sentiment to see whether the text is within acceptable bounds. In some embodiments, this processing may be omitted, and text may proceed straight to real or simulated publication.

After controller 204 processing, if applicable, or after receipt and quantification of input 202 if no controller 204 processing is performed, plant 206 may model publication of the text and/or may actually publish the text. As described in detail below, plant 206 may perform ML processing to model public reactions to the text based on past or projected future sentiment preferences. Alternatively and/or additionally, plant 206 may publish the text to at least a subset of the public or some other test group and collect data on how the public or other test group reacts.

Using the real or simulated feedback from plant 206, error section 208 may quantify reactions to the text. As described in detail below, these reactions may be quantified and compared with text from input 202 at summing junction 210. Differences between intended sentiment and modeled or observed sentiment may thus be fed back into the loop 200 and may cause controller 204 to adjust the content of the text.

The loop 200 may be repeatedly run through subsequent publication and/or modeling by plant 206, reaction gathering and processing by error section 208, and adjustment by controller 204, to refine the content of the text to automatically produce text having a desired sentiment. FIGS. 3-7 describe examples of how some embodiments may provide input 202 processing, controller 204 processing, plant 206 processing, error 208 processing, and training of various ML systems used thereby.

Figure 3:
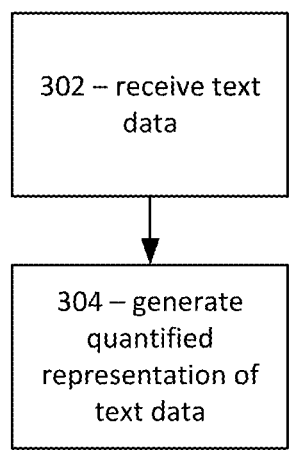
FIG. 3 shows an example input process according to some embodiments of the disclosure.

FIG. 3 shows an example input process 300 according to some embodiments of the disclosure. NLP system 110 and/or other components of system 100 may perform input process 300 to receive text data and prepare the text data for application to the feedback loop 200 described above. For example, process 300 may be an implementation of input 202 portion of loop 200 in some embodiments.

At 302, system 100 may receive text data. For example, the text data could be a script for a video ad or audio ad or text for a visual ad obtained by system 100 from data source 10. In some cases, the text data may be obtained by performing optical character recognition (OCR) on an existing ad or document.

At 304, system 100 may generate a quantified representation of the text data by processing the text data using at least one NLP algorithm. For example, NLP system 110 may use a term frequency—inverse document frequency (TFIDF) algorithm to produce a set of weights and outlier words for the text, where outlier words may be parts of the text that are different from other ads. Other algorithms may be used, but in any case, the quantified representation of the text data may indicate a sentiment of content of the text data, either as a whole, word-by-word, or both.

In some embodiments, generating the quantified representation of the text data may involve two stages of sentiment analysis. One stage may perform marketing language sentiment analysis, and another stage may perform customer reaction sentiment analysis. The marketing language sentiment analysis may use an algorithm with outputs such as joy, fear, sadness, anger, analytical, confidence, calmness, etc. Some embodiments may use off-the-shelf algorithms such as Qemotion or the IBM Watson Tone Analyzer, and/or may use custom algorithms configured to perform similar functions. The customer reaction sentiment analysis may use at least a positive or negative tone analysis. Some embodiments may use off-the-shelf labeled training sets such as Sentiment140, Amazon Product Data, Stanford Sentiment Treebank, Multi-Domain Sentiment Dataset, IMDB Movie Reviews Dataset, Twitter US Airline Sentiment, Paper Reviews Data Set, Sentiment Lexicons For 81 Languages, Lexicoder Sentiment Dictionary, Opin-Rank Review Dataset, and/or others for training a supervised learning model.

The following is an example of what inputs and outputs may look like, with more or less emotions in the output depending on the algorithm. The percentage scores correspond to how well the given sentence fits into the output category and thus do not have to sum to 100%.

Input Example

```
{"sentenceList": [
"I like double cheese pizza",
"I love black coffee and donuts",
"I don't want to have diabetes"]}
```

Output Example

```
[{
"positive": 0.455,
"negative": 0,
"sentence": "I like double cheese pizza",
"neutral": 0.545,
"compound": 0.3612
},
{
"positive": 0.512,
"negative": 0,
"sentence": "I love black coffee and donuts",
"neutral": 0.488,
"compound": 0.6369
},
```

-continued

```
{
"positive": 0,
"negative": 0.234,
"sentence": "I don't want to have diabetes",
"neutral": 0.766,
"compound": -0.0572
}]
```

Figure 4:
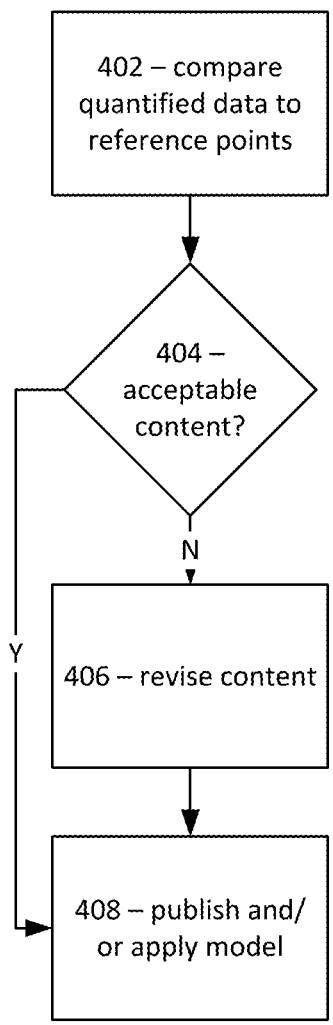
FIG. 4 shows an example controller process according to some embodiments of the disclosure.

FIG. 4 shows an example controller process 400 according to some embodiments of the disclosure. One or more components of system 100 (e.g., modification processing 130) may perform controller process 400 to compare the quantified data to reference points and, if applicable, make changes to the text, within the feedback loop 200 described above. For example, process 400 may be an implementation of controller 204 portion of loop 200 in some embodiments. The first time the text is encountered (e.g., upon initial input at 300), system 100 may proceed straight to the controller process 400 in some embodiments. In some embodiments, controller 204 (and therefore controller process 400) may be optional or omitted altogether.

At 402, system 100 may compare the quantified data to one or more reference points. This may be done to determine whether the script has a tone consistent with other ads (e.g., a business may have ads that have a "professional but playful" tone). For example, system 100 may reference a corpus of acceptable ads or a corpus of ads from the same company (or other companies) with sentiment scores (i.e., quantified reference data). The sentiment scores may be produced from a proxy for public perception, such as a stock price at the time of the ad, twitter mentions of the ad, etc.

For example, if system 100 is trying to determine the sentiment of "professional but playful," the sentiment model can be trained for specific sentiments such as "professional" and "playful" (as well as other sentiments). From there, if a score is over a certain threshold in the "playful" vector and over a certain threshold in the "professional" vector, then it would be considered valid and matching the expected tone.

At 404, system 100 may determine whether the content of the text is acceptable, for example by determining that the text has an acceptable sentiment relative to the corpus of data. In some embodiments system 100 may use an acceptable range comparison and support change in output. For example, a new message may be determined as out of an acceptable range, and it may be required to be placed in the range before being published. In another example, every day or at some other interval, the message may be edited a little and sent out to a group of people who provide feedback. In the latter case, the determination may be a check of time elapsed since the last change, or the like.

For example, if the overall sentiment is required to be over 80% positive, and one of the new ads is only 60% positive, it would be considered invalid. Alternately, if an existing ad were run through a newly trained model that uses updated sentiments from customers, and it no longer scores above the threshold, system 100 may trigger an adjustment or removal of the ad.

At 406, if the content is deemed unacceptable at 404, system 100 may revise the content. For example, system 100 may identify part of the text that is unacceptable (e.g., outside of range) and replace it with words that have an acceptable tone. This unacceptable identification could take the form of highlighting sentences with tone scores out of a predetermined acceptable range (e.g., using scoring format and range determination described above). System 100 may use algorithms that generate natural language (e.g., including off-the-shelf natural language generation algorithms known to those of ordinary skill and/or proprietary algorithms developed to perform similar functions) or a thesaurus to make direct swaps of words having similar meanings. In some embodiments, system 100 may prompt a user for input of new text to insert. For example, this may occur when a specific adjective, noun, term, use of term, etc., suddenly has negative sentiment from the public, in which case replacing the specific word would increase the overall sentiment dramatically. For instance, the word "cakewalk" has a racial history. If an ad slogan had "That was a cakewalk," then the use of the word "cakewalk" may have a significant negative impact to the sentiment, so the NLG may replace it with "super simple" to be "That was super simple."

At 408, system 100 may send the text that was deemed acceptable at 404 or that was modified at 406 to the plant. As described in detail with respect to FIG. 5 below, this may include delivering the text to members of the public and/or performing ML analysis on the text.

Figure 5:
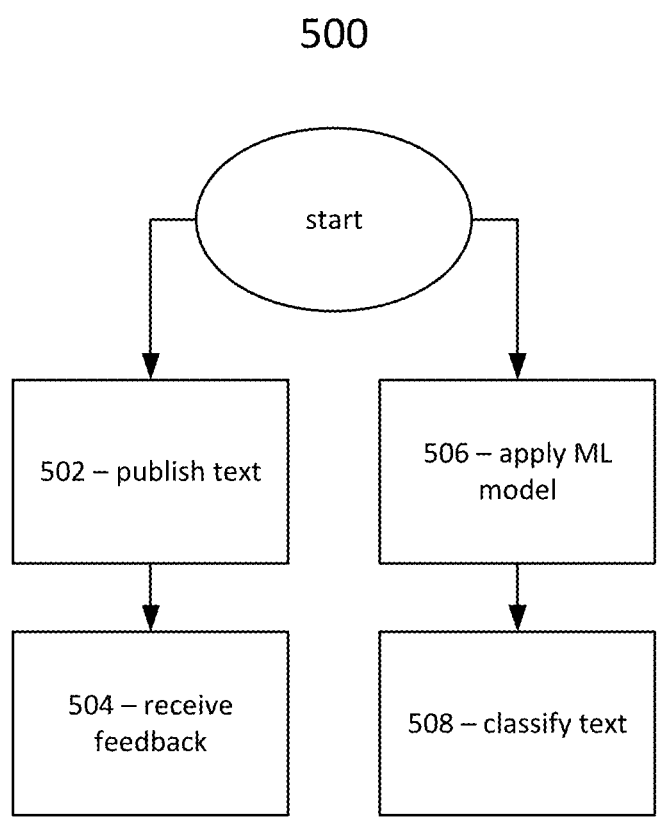
FIG. 5 shows an example plant process according to some embodiments of the disclosure.

FIG. 5 shows an example plant process 500 according to some embodiments of the disclosure, by which system 100 may determine a reaction to the content of the text data. One or more components of system 100 (e.g., reaction modeling 120 and/or modification processing 130) may perform plant process 500 to model possible reaction, obtain actual reaction data, and respond accordingly within the feedback loop 200 described above. For example, process 500 may be an implementation of plant 206 portion of loop 200 in some embodiments. In embodiments where controller 204 is present and controller process 400 is performed, system 100 may proceed to the plant process 500 after controller process 400 is complete. In embodiments where controller process 400 is not performed, the first time the text is encountered (e.g., upon initial input at 300), system 100 may proceed straight to the plant process 500.

As shown in FIG. 5, plant process 500 may include two separate branches (502-504 and 506-508). One branch (502-504) may gauge actual reactions to the text, and the other (506-508) may model predicted reactions to the text. In some embodiments, plant process 500 may include both branches, and the processing for each branch may be performed simultaneously, sequentially, or in any combination. Other embodiments may use one or the other, but not both, branches.

At 502, system 100 may publish the text in some fashion. For example, an actual ad using the text may be published, or a sample or mock ad using the text may be created and distributed. For example, the ad may be distributed to a focus group, a group in an A/B test, a random subset of app users of a given app or website visitors of a given website, all app users of the given app or website visitors of the given website, or according to other distribution schema. In some embodiments, publication may include any technical procedures required to incorporate the text into an app, website, or other software element.

At 504, system 100 may receive feedback from publication at 502. For example, feedback may be gathered by survey or sentiment reported directly by focus group members or others, A/B testing with prompts and/or surveys, obtaining app store reviews, twitter mentions, or any other indicia of public sentiment that can be linked with the publication made at 502.

In some embodiments, publication at 502 may include replacing a portion of the content with untested replacement content and publishing the text data including the untested replacement content. In this case, feedback obtained at 504 may include feedback on the untested replacement content. For example, some users may be given the ad as received by system 100, and other users may receive the ad as modified. During error processing (described below with respect to FIG. 6), sentiments of both options may be analyzed, as described below.

Alternatively and/or in addition to the processing at 502 and 504, at 506, system 100 may apply one or more ML models to the text. For example, reaction modeling processing 120 may apply a linear regression model or other supervised or unsupervised ML algorithm(s) to the quantified text. In some embodiments, the model(s) may include models trained on past public sentiment for text, where the training data includes samples of text and public reactions thereto for given periods of time in the past. Alternatively and/or additionally, the model(s) may include models trained on projected future public sentiment for text. Details about how such models may be trained in some embodiments are described below with respect to FIG. 7. An example using labeled data (i.e., supervised ML) may have 200k sentences that each had a sentiment of positive or negative associated with them. The model can be trained using this set of sentences, and system 100 may input new phrases to detect what their expected sentiment would be. Labeled data could come through manual tagging by employees, crowd sourcing, etc. At 508, system 100 may classify the text as having a particular sentiment in accordance with the outcome of the ML processing.

Figure 6:
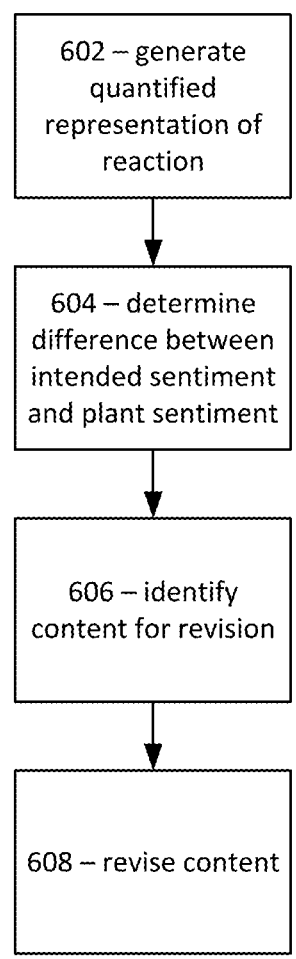
FIG. 6 shows an example error process according to some embodiments of the disclosure.

FIG. 6 shows an example error process 600 according to some embodiments of the disclosure. One or more components of system 100 (e.g., modification processing 130) may perform error process 600 to compare the quantified data to a quantified reaction and, if applicable, make changes to the text, within the feedback loop 200 described above. For example, process 600 may be an implementation of error 208 portion and/or summing junction 210 portion of loop 200 in some embodiments.

At 602, system 100 may generate a quantified representation of the reaction data gathered in process 500. For example, when the reaction is in the form of feedback from publication, similar or the same NLP algorithms as used in process 300 may be used to generate the quantified representation of the reaction data that indicates a sentiment expressed by the reaction. NLP sentiment analysis may analyze social media replies, comments on an ad itself, Instagram feedback, Reddit comments, Facebook feedback, survey feedback, etc. In cases where ML modeling was used to generate the predicted sentiment, the data may already be in quantified form, and therefore NLP processing may be unnecessary.

Processing that may be used for sentiment analysis is described above with respect to element 304 of process 300. The following is an example of feedback processing using such algorithm(s):

marketing sentence "our product is the best bro"
  twitter reply: "wow this messaging was very unprofessional. I expect more from your brand"
  twitter reply sentiment analysis:

```
{
"playful": 0.000
"surprised": 0.800,
"disappointed": 0.400
}
``` expected twitter reply sentiment:

```
{
"playful": 0.400,
"surprised": 0.200,
"disappointed": 0.000
}
```

At 604, system 100 may determine a difference between the quantified representation of the reaction (plant sentiment) and the quantified representation of the text data (intended sentiment). The quantified difference may be the root mean square error (RMSE) between expected and actual responses in aggregate. For example, the following may be a calculation of RMSE for expected and actual sentiments:

input sentence: "Our product is the best"
  intended sentiment:

```
{
"playful": 0.455,
"happy": 0.790,
"angry": 0.000
"serious":0.000
}
``` actual sentiment:

```
{
"playful": 0.000,
"happy": 0.001,
"angry": 0.000
"serious":0.900
}
```

Root Mean Square Error: 0.64

At 606, system 100 may identify, based on the difference determined at 604, a portion of the content having an unintended sentiment. For example, if the marketing message is a paragraph, and individual sentences are run through the algorithm as detailed above, then the sentences with high RMSE can be highlighted to the user in a user interface or otherwise reported.

At 608, system 100 may revise the text by replacing the portion of the content identified at 606 with different content. This may proceed similarly to the processing described above at element 406 of process 400 using natural language generation, for example. The following is a sample revision:

input: "Our product is the best"
  input desired sentiment:

```
{
"excitement": 0.700
}
``` output: "Our product is the absolute best!"

As noted above, in some embodiments, some users may be given the ad as received by system 100, and other users may receive the ad as modified. In this case, system 100 may generate separate quantified representations for both options at 602, determine differences for both options at 604, and at 606 identify which option gives the more correct sentiment (e.g., is closer to the intended sentiment or delivers the intended sentiment). If the modified text delivers the intended sentiment and the original text does not, revision at

608 may include incorporating the modified text into the version of the text that is ultimately distributed more widely.

Referring again to FIG. 2, after the text is revised (e.g., at summing junction 210), the loop 200 may continue, so that the revised text passes through the controller 204, plant 206 (likely at least in the form of publication to members of the public at this stage), error checking 208, revision at summing junction 210, and may continue to repeat multiple times. This may allow system 100 to continually revise the text to compensate for changing sentiment as expressed by members of the public and automatically prevent unsuitable (e.g., offensive or inappropriate) content from being made public. This process provides complete automation of message sentiment maintenance in a manner that is computationally efficient (e.g., automated processing obviates the need for stored alternatives of text copy) and more responsive and accurate than alternatives (e.g., public reaction can be gauged as it changes, without requiring manual or automatic changes to the definition of a sentiment).

Figure 7:
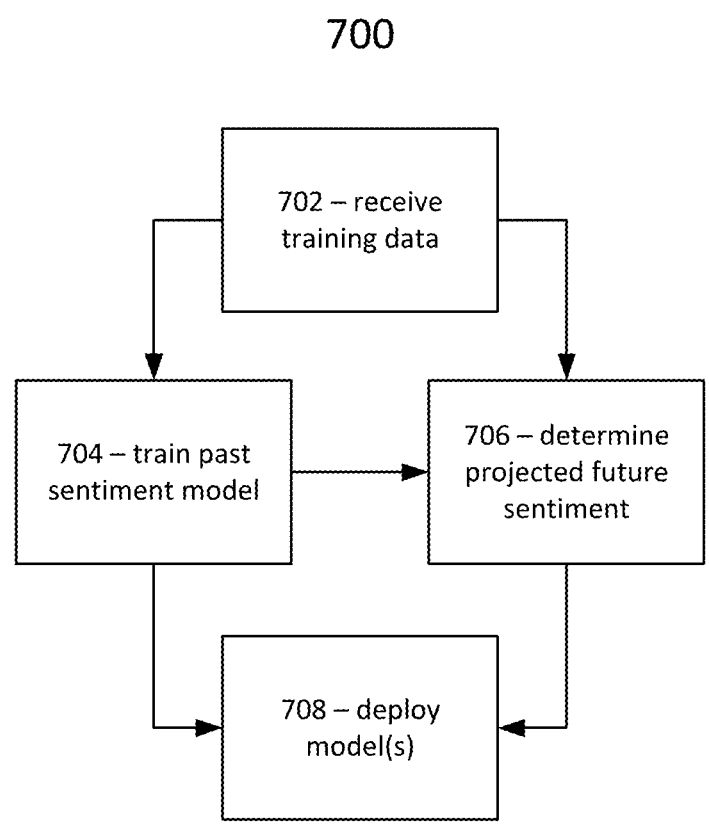
FIG. 7 shows an example training process according to some embodiments of the disclosure.

FIG. 7 shows an example training process 700 according to some embodiments of the disclosure. System 100 can perform process 700 to prepare models used for sentiment analysis and/or NLP as described above. FIG. 7 shows the training of models that rely on past data and on projected future data separately. Note that while FIG. 7 shows each model being trained as part of a single process 700 for ease of illustration, in other embodiments the training of respective models may be performed independently. Moreover, in some embodiments, the same model may be trained on both past and future data (e.g., processing at 704 and 708, described below, may be combined).

At 702, system 100 can receive training data. For example, the training data can include a corpus of training text with sentiment definitions in some embodiments, and/or the training data can include expressions of sentiment. The training data can be labeled or unlabeled, depending on whether the ML model to be trained uses supervised or unsupervised learning. In some cases, system 100 can receive both labeled and unlabeled data, allowing it to train both supervised and unsupervised models.

At 704, system 100 can train a model used for sentiment analysis based on past sentiment data. For example, system 100 can use training data received at 702 that has been labeled to indicate sentiment in the text to train a Naïve bayes or other supervised ML model to identify positive and negative sentiments in text. One or more data sets may be used (e.g., public reaction data sets from different time periods, such as annually or in some other increment). System 100 can use standard ML training procedures where all parameters are updated in one training process and/or can use online learning procedures wherein each parameter of the model is trained and updated one by one with multiple training passes.

At 706, system 100 can use training data received at 702 to generate projected future sentiment data. For example, system 100 can run a model trained at 704 on different discrete sets of past reaction data separately and plot a trend on the outcomes. For example, system 100 may separately process 2020 public reaction data, 2019 public reaction data, and 2018 public reaction data and, based on differences between the outcomes of each processing, plot a future public reaction prediction that may be used as an ML model.

For example, a phrase uttered by someone in a high position may impact the public perception of the term or terms used in that phrase—the public perception could be either changed positively, negatively, or heavily split based on the (likely unintentional) reference to the term(s). As an example, if an ad slogan/sentence included a famous phrase said by a recent president, or if it was used in an interview with a prominent athlete or television personality, then the association with that phrase or interview could adjust the public perception. Thus, sentiment before the public figure had their quote and after the public figure's quote could be starkly different.

At 708, system 100 can deploy the models trained as described above. For example, the models can be stored in memory of system 100 and/or a machine learning platform (e.g., a component of system 100, a separate component accessible to system 100, a cloud-based service, etc.). When system 100 performs processing using ML algorithms as described above, the trained models can be deployed to facilitate the ML processing.

Figure 8:
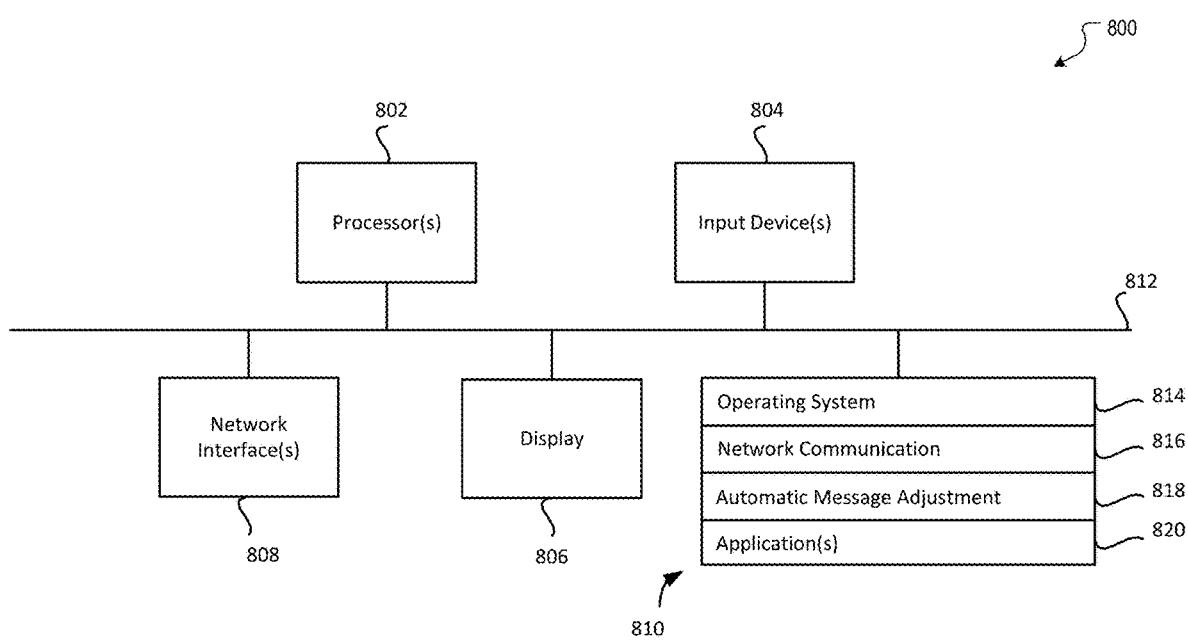
FIG. 8 shows a computing device according to some embodiments of the disclosure.

FIG. 8 shows a computing device 800 according to some embodiments of the disclosure. For example, computing device 800 may function as system 100 or any portion(s) thereof, or multiple computing devices 800 may function as system 100.

Computing device 800 may be implemented on any electronic device that runs software applications derived from compiled instructions, including without limitation personal computers, servers, smart phones, media players, electronic tablets, game consoles, email devices, etc. In some implementations, computing device 800 may include one or more processors 802, one or more input devices 804, one or more display devices 806, one or more network interfaces 808, and one or more computer-readable mediums 810. Each of these components may be coupled by bus 812, and in some embodiments, these components may be distributed among multiple physical locations and coupled by a network.

Display device 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device 804 may be any known input device technology, including but not limited to a keyboard (including a virtual keyboard), mouse, track ball, and touch-sensitive pad or display. Bus 812 may be any known internal or external bus technology, including but not limited to ISA, EISA, PCI, PCI Express, NuBus, USB, Serial ATA or FireWire. In some embodiments, some or all devices shown as coupled by bus 812 may not be coupled to one another by a physical bus, but by a network connection, for example. Computer-readable medium 810 may be any medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 810 may include various instructions 814 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 may establish and maintain network connections (e.g., software for implementing communication protocols, such as TCP/IP, HTTP, Ethernet, telephony, etc.).

Automatic message adjustment 818 may include the system elements and/or the instructions that enable computing device 800 to perform the processing of system 100 as described above. Application(s) 820 may be an application that uses or implements the outcome of processes described herein and/or other processes. For example, application(s) 820 may publish and/or display advertisements and/or other published materials that have been created and/or modified as described above. In some embodiments, the various processes may also be implemented in operating system 814.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:
1. A method comprising:
 receiving, by a processor, text data;
 obtaining, by the processor, feedback responsive to
  replacement content from at least one public source;

generating, by the processor, a quantified representation of the feedback;
generating, by the processor, a quantified representation of the text data by processing the text data using at least one natural language processing (NLP) algorithm, the quantified representation of the text data indicating a sentiment of content of the text data; and
automatically revising, by the processor, the content of the text data, the revising comprising:
  determining a difference between quantified data indicative of a reaction and the quantified representation of the text data;
  identifying, based on the difference, a portion of the content having an unintended sentiment;
  determining which one of the quantified data indicative of the reaction and the quantified representation of the feedback has a preferred sentiment; and
  replacing the portion of the content with different content, the replacing comprising inserting the different content within a user interface to thereby automatically adjust a sentiment associated with the user interface, wherein the different content comprises untested content in the text data in response to the quantified representation of the reaction having the preferred sentiment or the different content comprises the replacement content in the text data in response to the quantified representation of the feedback having the preferred sentiment.

2. The method of claim 1, wherein the revising further comprises:
  comparing the quantified representation of the text data to quantified reference data;
  identifying, based on the comparing, a second portion of the content having an unintended sentiment; and
  replacing the second portion of the content with second different content.

3. The method of claim 1, wherein the obtaining the feedback comprises:
  replacing a third portion of the content with untested replacement content; and
  publishing the text data including the untested replacement content and obtaining feedback on the untested replacement content from the at least one public source.

4. The method of claim 1, wherein the replacing comprises generating at least a portion of the different content by executing a natural language generation algorithm, identifying at least a portion of the different content by performing a thesaurus lookup, receiving at least a portion of the different content as user input, or a combination thereof.

5. The method of claim 1, further comprising generating the quantified data indicative of the reaction by publishing the text data and obtaining feedback from at least one public source.

6. The method of claim 1, further comprising generating the quantified data indicative of the reaction by performing machine learning processing of the quantified representation of the text data and a model of past reactions, future reactions, or a combination thereof.

7. The method of claim 6, further comprising training the model, the training comprising creating future reaction training data through extrapolation of past reaction training data.

8. A system comprising:
a processor; and
a non-transitory computer-readable medium in communication with the processor and storing instructions that, when executed by the processor, cause the processor to perform processing comprising:
  receiving text data;
  obtaining feedback responsive to replacement content from at least one public source;
  generating a quantified representation of the feedback;
  generating a quantified representation of the text data by processing the text data using at least one natural language processing (NLP) algorithm, the quantified representation of the text data indicating a sentiment of content of the text data; and
  automatically revising the content of the text data, the revising comprising:
    determining a difference between quantified data indicative of a reaction and the quantified representation of the text data;
    identifying, based on the difference, a portion of the content having an unintended sentiment;
    determining which one of the quantified data indicative of the reaction and the quantified representation of the feedback has a preferred sentiment; and
    replacing the portion of the content with different content, the replacing comprising inserting the different content within a user interface to thereby automatically adjust a sentiment associated with the user interface, wherein the different content comprises untested content in the text data in response to the quantified representation of the reaction having the preferred sentiment or the different content comprises the replacement content in the text data in response to the quantified representation of the feedback having the preferred sentiment.

9. The system of claim 8, wherein the revising further comprises:
  comparing the quantified representation of the text data to quantified reference data;
  identifying, based on the comparing, a second portion of the content having an unintended sentiment; and
  replacing the second portion of the content with second different content.

10. The system of claim 8, wherein the obtaining the feedback comprises:
  replacing a third portion of the content with untested replacement content; and
  publishing the text data including the untested replacement content and obtaining feedback on the untested replacement content from the at least one public source.

11. The system of claim 8, wherein the replacing comprises generating at least a portion of the different content by executing a natural language generation algorithm, identifying at least a portion of the different content by performing a thesaurus lookup, receiving at least a portion of the different content as user input, or a combination thereof.

12. The system of claim 8, wherein the processing further comprises generating the quantified data indicative of the reaction by publishing the text data and obtaining feedback from at least one public source.

13. The system of claim 8, wherein the processing further comprises generating the quantified data indicative of the reaction by performing machine learning processing of the quantified representation of the text data and a model of past reactions, future reactions, or a combination thereof.

14. The system of claim 13, wherein the processing further comprises training the model, the training comprising creating future reaction training data through extrapolation of past reaction training data.

15. A method comprising:
receiving, by a processor, communications data;

obtaining, by the processor, feedback responsive to replacement content from at least one public source;

generating, by the processor, a quantified representation of the feedback;

generating, by the processor, a quantified representation of the communications data by processing the communications data using at least one machine learning (ML) algorithm, the quantified representation of the communications data indicating a sentiment of content of the communications data; and automatically revising, by the processor, the content of the communications data, the revising comprising:

determining a difference between a quantified representation of a reaction to the content of the communications data and the quantified representation of the communications data;

identifying, based on the difference, a portion of the content having an unintended sentiment;

determining which one of the quantified data indicative of the reaction and the quantified representation of the feedback has a preferred sentiment; and replacing the portion of the content with different content, the replacing comprising inserting the different content within a user interface to thereby automatically adjust a sentiment associated with the user interface, wherein the different content comprises untested content in the text data in response to the quantified representation of the reaction having the preferred sentiment or the different content comprises the replacement content in the text data in response to the quantified representation of the feedback having the preferred sentiment.

16. The method of claim 15, wherein the revising further comprises:

comparing the quantified representation of the communications data to quantified reference data;

identifying, based on the comparing, a second portion of the content having an unintended sentiment; and replacing the second portion of the content with second different content.

17. The method of claim 15, wherein the obtaining the feedback comprises:

replacing a third portion of the content with untested replacement content; and publishing the communications data including the untested replacement content and obtaining feedback on the untested replacement content from the at least one public source.

18. The method of claim 15, further comprising generating the quantified representation of the reaction to the content of the communications data by publishing the communications data and obtaining feedback from at least one public source.

19. The method of claim 15, further comprising generating the quantified representation of the reaction to the content of the communications data by performing machine learning processing of the quantified representation of the communications data and a model of past reactions, future reactions, or a combination thereof.

20. The method of claim 19, further comprising training the model, the training comprising creating future reaction training data through extrapolation of past reaction training data.

* * * * *